UNITED STATES PATENT OFFICE.

GEORGE WEINTRAUB, OF LYNN, MASSACHUSETTS, ASSIGNOR TO GENERAL ELECTRIC COMPANY, A CORPORATION OF NEW YORK.

STABLE BORON NITRID AND THE PROCESS OF MAKING THE SAME.

1,157,271.      Specification of Letters Patent.      Patented Oct. 19, 1915.

No Drawing.      Application filed February 3, 1913. Serial No. 745,819.

*To all whom it may concern:*

Be it known that I, GEORGE WEINTRAUB, a citizen of the United States, residing at Lynn, in the county of Essex, State of Massachusetts, have invented certain new and useful Improvements in Stable Boron Nitrid and the Process of Making the Same, of which the following is a specification.

Various processes for making nitrid of boron, are described in the chemical literature. The boron nitrid thus produced is not chemically stable. For example, it is slowly decomposed by hot water, forming boric anhydrid and ammonia. It is also quite readily oxidizable even at relatively low temperatures. Its chemical instability may be due either to its physical state or to associated impurities. The instability of boron nitrid is more marked in the product of certain reactions than others, but to my best knowledge the above holds true of all boron nitrid heretofore produced.

I have discovered that when chemically unstable boron nitrid is heated to a temperature of about 2000° C. or even higher, that it is converted into a stable modification. This form of boron nitrid can be heated in boiling water without any appreciable decomposition. It is also more stable in the presence of oxygen, even at moderately high temperatures. My invention therefore includes both this process and its product, namely chemically stable boron nitrid.

The process may be carried out in any furnace giving the required temperature, conveniently in an electric resistance furnace. Any form of boron nitrid may be thus treated, for example, the nitrid producible by the reduction of boric anhydrid with magnesium in the presence of an ammonium salt as described in Patent No. 1,077,712, issued November 4, 1913, to Richard Heyder assigned to the General Electric Company. The boron nitrid made by passing ammonia over boric anhydrid may be similarly treated to produce a stable nitrid.

I prefer to add to the unstable nitrid about 20% of borax, boric anhydrid, or other boron compound volatilizable at the temperature of treatment so as to prevent by the resulting protective atmosphere of boron compounds the oxidation of boron nitrid. The heating is continued until no more fumes are given off. The time necessary may be as short as a few minutes depending on the quantity used.

What I claim as new and desire to secure by Letters Patent of the United States, is:—

1. The process which consists in heating chemically unstable boron nitrid to a temperature of about 2000° C. surrounded by a protective atmosphere until no more fumes are evolved.

2. The process which consists in heating chemically unstable boron nitrid to a temperature of about 2000° C. surrounded by an atmosphere of gas suppressing the decomposition of the nitrid.

3. An article of manufacture comprising boron nitrid, stable with respect to hot water.

4. A composition of matter comprising boron nitrid substantially stable with respect to water and oxygen at an elevated temperature.

In witness whereof, I have hereunto set my hand this 31st day of January, 1913.

GEORGE WEINTRAUB.

Witnesses:
JOHN A. McMANUS, Jr.,
FRANK G. HATTIE.